Feb. 19, 1963 A. R. SASS 3,078,445

INFORMATION STORAGE

Filed March 2, 1960 3 Sheets-Sheet 1

INVENTOR.
ANDREW R. SASS
BY John V. Regan
ATTORNEY

Feb. 19, 1963 A. R. SASS 3,078,445

INFORMATION STORAGE

Filed March 2, 1960 3 Sheets-Sheet 2

INVENTOR.
ANDREW R. SASS
BY John V. Regan
ATTORNEY

Feb. 19, 1963 A. R. SASS 3,078,445

INFORMATION STORAGE

Filed March 2, 1960 3 Sheets-Sheet 3

INVENTOR.
ANDREW R. SASS
BY John V. Regan
ATTORNEY

United States Patent Office 3,078,445 Patented Feb. 19, 1963

3,078,445
INFORMATION STORAGE

Andrew R. Sass, Rego Park, New York, N.Y., assignor to Radio Corporation of America, a corporation of Delaware Filed Mar. 2, 1960, Ser. No. 12,460
8 Claims. (Cl. 340—173.1)

The present invention relates to a new and improved superconductor memory circuit.

An object of the invention is to provide a high capacity, high speed, small dimension, superconductor memory circuit which is suitable for use in an electronic computer.

Another object of the invention is to provide a superconductor memory circuit which can very easily be fabricated and which has only a small number of parts.

Another object of the invention is to provide a superconductor memory having low power dissipation.

The memory circuit of the invention includes a pair of crossed superconducting films. One of the films is in the form of a pair of loops joined by a superconducting portion of restricted cross-section. The other of the films is in the form of a lead spaced from and immediately adjacent to the superconducting portion of restricted cross-section. Storage of the binary digit "one" corresponds to the circulation of current in one loop in one direction and in the other loop in the opposite direction and storage of the binary digit "zero" is represented by a reversal in the circulating currents. In order to write a binary digit into the memory, coincident currents are applied to the crossed films. Information can be read out of the memory also by use of coincident currents. During readout it is necessary to reverse the current only in the superconducting lead.

The invention will be described in greater detail by reference to the following description taken in connection with the accompanying drawing in which.

Figure 1:
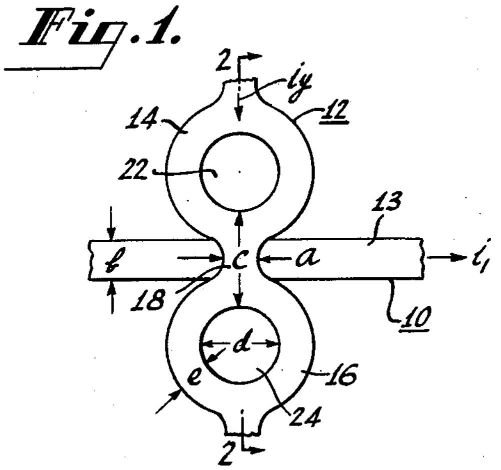
FIG. 1 is a plan view of a superconductor memory element according to the present invention.
Figure 6:
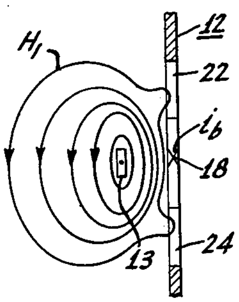
Figure 7:
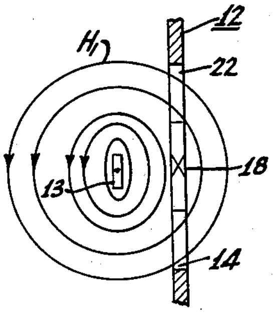
Figure 8:
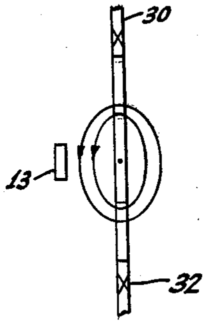
Figure 9:
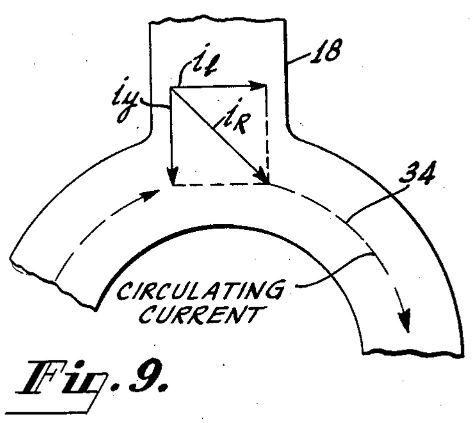
Figure 10:
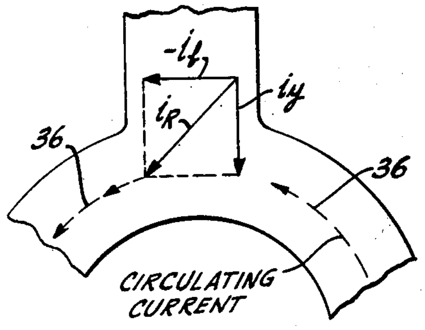
Figure 13:
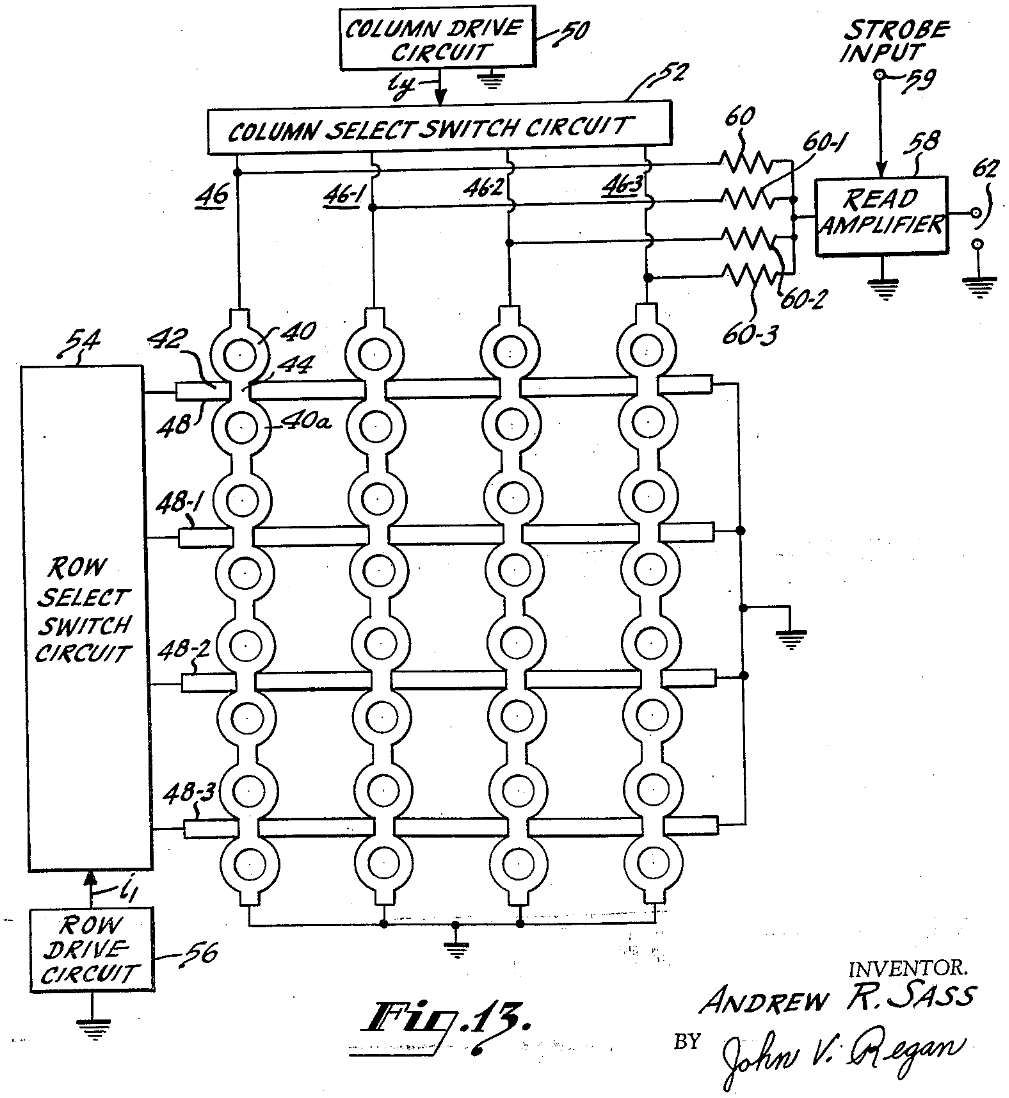

FIGS. 6, 7, and 8 are cross-sections through the memory element of FIG. 1 to explain the process by which the magnetic field links adjacent holes and causes a persistent supercurrent;

FIGS. 9 and 10 are enlarged plan views of the "bridge" portion of the memory element of FIG. 1 with current vectors superimposed;

FIGS. 11*a*, 11*b*, 12*a*, and 12*b* are vector diagrams to explain the memory element operation when persistent currents are present; and FIG. 13 is a block and schematic drawing of a coincident current memory matrix according to the present invention.

Figure 2:
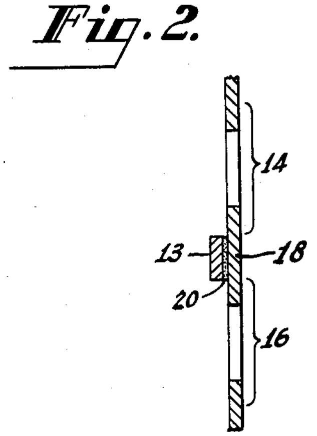
FIG. 2 is a cross-section along line 2—2 of FIG. 1.

The memory element shown in FIGS. 1 and 2 includes a pair of crossed superconducting films 10 and 12. Film 10 is in the form of a single lead 13 and film 12 consists of two loops 14 and 16, respectively, joined by a superconducting portion 18 of restricted cross-section. The latter is hereafter termed a "bridge." The lead 13 is spaced from and immediately adjacent to the bridge 18. In a practical circuit an insulating material such as silicon monoxide may be used to space the lead from the bridge. This material is shown at 20 in FIG. 2.

Lead 13 and superconducting film 12 are both formed of superconducting material. As will be explained in more detail later, lead 12 is preferably formed of a hard superconductor such as lead and film 12 is preferably formed of a soft superconductor such as tin. In other words, the film 12 is capable of being driven normal more easily (by a smaller current density or smaller magnetic field) than lead 13. The memory circuit is immersed in a low temperature environment such as one maintained lower than 3.7° K.—the temperature at which tin becomes superconducting. The means for doing this is well-known and need not be discussed here.

The operation of the memory element may be better understood by referring to FIGS. 3–8. As will be explained later, it is contemplated that the memory circuit will be driven by coincident currents $i_1$ and $i_y$ (FIG. 1). However, for the purposes of the present discussion, it is assumed to start with that a drive current $i_1$ in the form of a pulse is applied to the superconducting lead 13 and no current $i_2$ is applied to the loops 14 and 16. The current passing through lead 13 produces a magnetic field $H_1$ (see FIGS. 4 and 6) which attempts to but cannot pass through the holes 22 and 24 in the two loops. Both the winding 13 and the film 12 are superconducting. As is well understood, a superconducting element acts as a shield to a magnetic field and accordingly the bridge 18 prevents the magnetic field $H_1$ from penetrating. This is shown most clearly in FIG. 6. The magnetic field $H_1$ is thought to induce supercurrent $i_b$ (see FIG. 4) at the bridge, as shown by the small arrow legended $i_b$, and, since this current must have a closed path in which to flow, the circulating supercurrents $i_2$ in the two loops result. The magnitude of the supercurrent is thought to be sufficient to produce a magnetic field $H_2$ which counteracts the magnetic field $H_1$ (see FIG. 4) and this is thought to be the reason that the superconductor bridge 18 acts as a shield.

Figure 3:
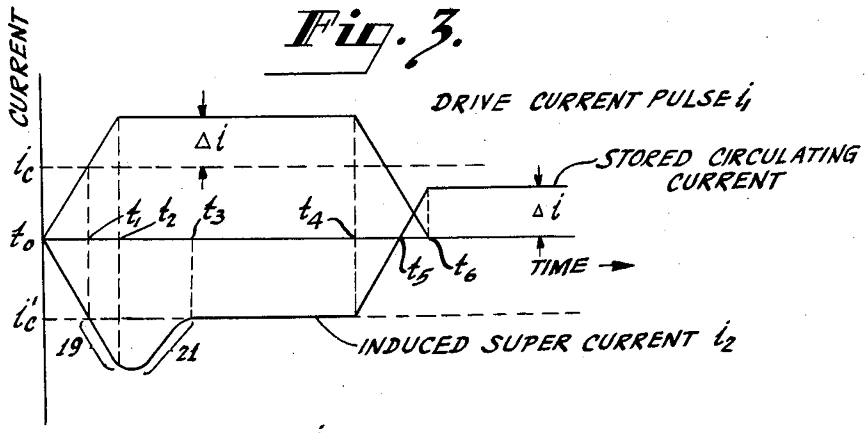
FIG. 3 is a graph to explain the operation of the circuit of FIG. 1.

The drive current pulse $i_1$ and the induced supercurrent are shown in graphical form in FIG. 3. It may be observed that during the period $t_0$ to $t_1$ the drive current $i_1$ is increasing and the induced supercurrent $i_2$ is increasing. The direction of induced current flow is also seen to be opposite from that of the drive current $i_1$.

The critical current $i_c'$ for a superconductor may be defined as that value of current above which the superconductor switches from its superconducting to its normal state. It may be observed that the bridge is of much smaller dimensions than the loop so that its critical current density is reached before it is reached in the loops. In other words, when the drive current is increased to a value slightly greater than that required to induce the current $i_c'$ at the bridge, the bridge switches to normal while the remainder of the loop remains superconducting.

Referring still to FIG. 3, when the drive current reaches a value $i_c$, the induced current $i_2$ reaches a value $i_c'$ sufficient to switch the bridge to its normal state. One might believe that the current through the bridge would now decrease. However, this does not occur. The drive current $i_1$ continues to increase during the period $t_1$ to $t_2$ and the lines of magnetic flux produced by the drive current are now cut by a conductor since these lines of flux penetrate the now normal bridge. As is well understood, when a conductor in the normal state cuts lines of magnetic flux, a current is induced in the conductor. Thus, during the period $t_1$ to $t_2$ the bridge current continues to increase as shown at 19.

At time $t_2$, the drive current $i_1$ stops increasing. There is, therefore, no longer any changing flux and no longer any current induced due to changing flux. The bridge is normal and accordingly the current $i_2$ at the bridge decreases as shown at 21 in FIG. 3. When the current reduces sufficiently, as at time $t_3$, so that it is slightly less than the critical current $i_c'$, the bridge switches back from its normal to its superconducting state and persistent currents circulate in the loop. The persistent currents are in the directions indicated by arrows 26 and 28 in FIG. 4.

At time $t_4$, the drive current $i_1$ begins to decrease. As may be seen in FIG. 3, the induced current $i_2$ decreases with the drive current, passes through zero at time $t_5$, subsequently reverses polarity, and at time $t_6$, when the drive current has reduced to zero, assumes a fixed value $\Delta i$. It may be observed from the graph that the current value $\Delta i$ is substantially equally to the amount that the drive current $i_1$ has exceeded $i_c$ if the coupling between 13 and 18 is close enough to unity. In practice, the films are sufficiently close that the coupling is substantially unity.

Figure 4:
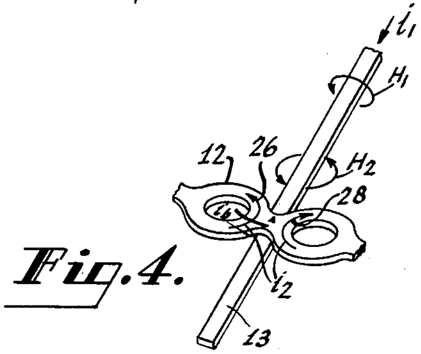
FIGS. 4 and 5 are perspective views of the memory element of FIG. 1 to explain the directions of the induced currents.
Figure 5:
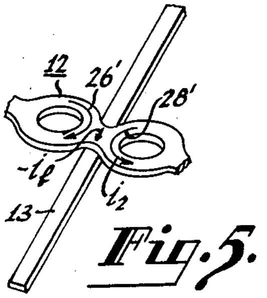

FIG. 5 shows the direction in which the persistent circulating current circulates after time $t_6$. Note that $i_b$ has reversed and the circulating current flow illustrated in FIG. 5 is opposite to the circulating current flow shown in FIG. 4. These directions of flow may be reduced from FIG. 3.

The circuit operation is also shown in FIGS. 7 and 8. FIG. 7 illustrates the situation during the interval from $t_1$ to $t_5$. Current flow in lead 13 is in a direction out of the paper and the magnetic field $H_1$ is in the direction indicated. The bridge 18 has switched from its superconducting to its normal state and bridge curent flow is also in the direction into the paper. When the bridge 18 is normal, it no longer acts as a shield to the magnetic field $H_1$ and the magnetic field passes through the bridge and "links" holes 22 and 24. When the drive current stops, as is shown in FIG. 8, the flux is trapped as indicated and a persistent supercurrent flows through the loops and bridge in the direction out of the paper at the bridge and into the paper at 30 and 32.

In actual operation of the memory circuit of FIG. 1, coincident currents are applied to each memory element. One of these currents is $i_1$, the drive current just described, and it induces a current $i_b$ at the bridge parallel to $i_1$. The second current is $i_y$ and it is applied through the loops. The vectors representing these currents are shown in FIGS. 9 and 10, superimposed over an enlarged plan view of the bridge and a portion of the lower loop. The current $i_y$ flows in a direction at right angles to the induced current $i_b$. Thus, the resultant of $i_b$ and $i_y$ is the vector sum of the two, $i_R$. Neglecting any persistent current, it can easily be seen that when $i_R$ or $\sqrt{i_y^2+i_b^2}$ is greater than $i_c'$, the bridge is driven normal and a circulating current initially flows clockwise (as viewed in the drawing) in the lower of a pair of loops, as is shown in dashed line 34, FIG. 9, and counterclockwise in the upper of the pair of loops.

If the drive current is reversed, it induces a current $-i_b$ at the bridge. when the vector sum of the currents $-i_b$ and $i_y$ (neglecting any peristent current) is sufficient to drive the bridge normal, current initially circulates in the lower loop in a direction opposite to that shown in FIG. 9. This is illustrated in FIG. 10 by the dashed lines 36 and the arrowhead indicating counterclockwise current flow. Again, current flows clockwise in the upper loop (not shown), when it flows counterclockwise in the lower loop as is seen in FIGS. 4 and 5. It should be noted that the direction of current flow in the loops can be changed by changing the polarity of only one of the currents, that is, the current flowing through lead 13.

Figures 11A, 12A:
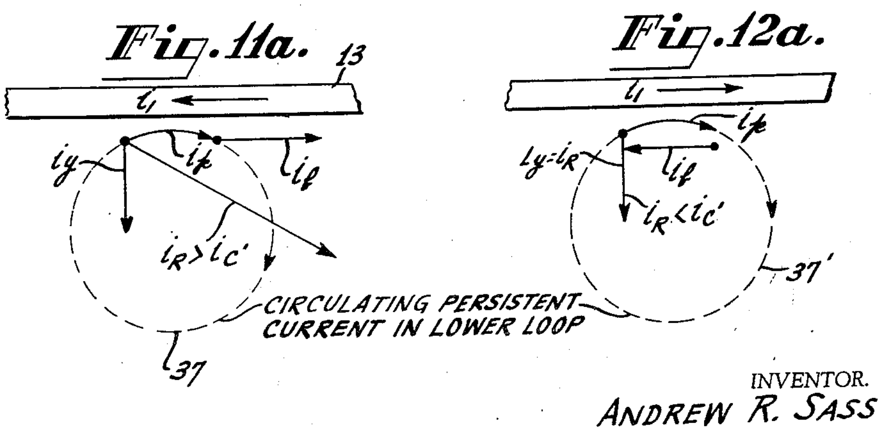
Figures 11B, 12B:
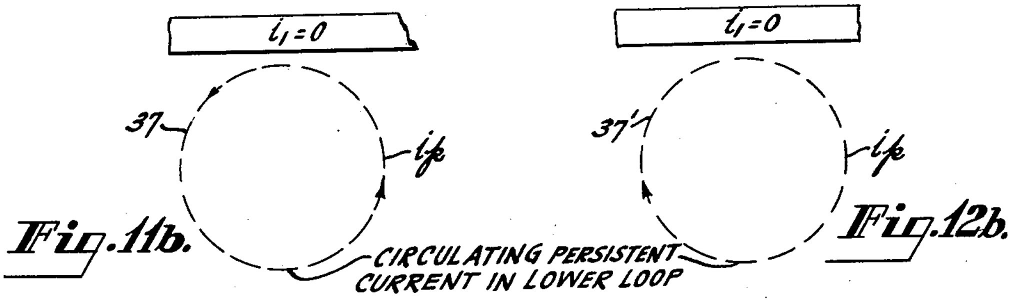

In the discussion above, the effect of persistent circulating currents has been neglected. In practice, such effects play an important part, as is illustrated in FIGS. 11 and 12. FIG. 11*a* should be referred to first. It is assumed in FIG. 11*a* that the bridge has previously been driven normal and a persistent circulating current 37 has been set up in the lower loop. This current circulates in a clockwise direction and the component of current at the bridge is shown as $i_p$. Assume now that coincident current pulses $i_1$ and $i_y$ are applied to the drive lead 13 and loop, respectively. The drive current $i_1$ induces a supercurrent $i_b$ at the bridge as already explained. Note that the induced supercurrent $i_b$ is initially in the opposite direction from the driving current and is therefore in a direction to add to the persistent current $i_p$. As was the case previously, the drive current $i_y$ applied to the loop is at right angles both to the induced current $i_b$ and the persistent current $i_p$. The pulse amplitudes are such that the vector sum $i_R$ of $i_p$, $i_b$, and $i_y$ is greater than the bridge critical current $i_c'$ and the bridge goes normal. When pulses $i_1$ and $i_y$ are over, a persistent current remains circulating in the lower loop as is shown in FIG. 11*b*, however, the direction of the persistent current has reversed. Formerly, the persistent current flowed clockwise as shown in FIG. 11*a* and now it flows counterclockwise as shown in FIG. 11*b*. The explanation for this has already been given in connection with FIG. 3. It may be seen there that during the period $t_0$ to $t_5$ (FIG. 3) the induced supercurrent is in one direction and at time $t_5$ the induced supercurrent reversed and the stored circulating current or persistent current then flows in the opposite direction.

FIGS. 12*a* and 12*b* illustrate what happens to the persistent current when the direction of drive current $i_1$ is reversed but the direction of drive current $i_y$ remains the same. The circulating persistent current initially is assumed to be circulating in the clockwise direction, just as in the case of FIG. 11*a*. The drive current $i_1$ induces a current $i_b$ at the bridge. It may be assumed that the induced supercurrent $i_b$ is equal to the persistent current $i_p$ although this is not essential. The vector sum of the persistent current $i_p$ and the induced current $i_b$ is zero so that the resultant of the three currents $i_p$, $i_b$, and $i_y$ is equal to $i_R$. The drive pulse amplitudes are such that $i_y$ or $i_R$ is less than the critical bridge current $i_c'$ so that the bridge is not driven normal by the coincident currents $i_y$ and $i_1$. Accordingly, the circulating current 37' remains flowing in the same direction as is indicated in FIG. 12*b*.

For the purposes of the explanation above, it was stated that the induced current $i_b$ is equal to the persistent current $i_p$. This, of course, need not be the case. All that is required is that the vector sum of $i_b$, $i_p$, and $i_y$ be less than $i_c'$.

A coincident current memory according to the invention is shown in FIG. 13. Each memory element in the matrix consists of a pair of loops 40—40*a*, for example, and a lead 42, for example, which passes at right angles to and immediately adjacent to the bridge 44 between the two loops. The elements are arranged in columns 46, 46–1, 46–2, and 46–3, and rows 48, 48–1, 48–2, and 48–3. A 4 x 4 memory matrix is shown for purposes of illustration, however, it will be appreciated that the memory may contain many more than 4 x 4 elements.

The columns are driven by a column drive circuit 50 which is connected to a selected one of the columns by a column select switch circuit 52. This and the row select switch circuit 54 are conventional and need not be discussed in detail. The function of these circuits is to select one column from all the parallel columns so that a drive pulse applied from circuit 50 will pass through the selected column and not through the others.

The rows are driven from a row drive circuit 56 which is connected to a selected one of the rows by means of the row select circuit 54. The row drive circuit is capable of producing both positive and negative pulses. The column drive circuit need produce pulses of only a single polarity. Both drive circuits are preferably constant current pulse sources. In other words, their internal impedance is relatively high compared to that of the load they drive.

The read amplifier 58 is connected to all of the columns. The resistors 60 to 60–3 are for the purposes of isolating the columns from one another. They are of sufficient value to prevent a drive pulse applied to one column from appreciably affecting another column. The output signal from the memory is available at leads 62.

The memory may be operated as follows. It may be assumed initially that in each pair of loops current is circulating clockwise in the lower loop and counterclockwise in the upper loop (as in FIG. 11*a*) and that this condition represents storage of the binary digit "zero." Thus, all memory elements are storing the binary digit "zero." Assume also that it is desired to write the binary digit "one" into the pair of loops lying in column 46 (first from the left) and row 48 (first from the top). This is the only pair of loops to which reference numerals have been applied. The column and row select switch circuits are arranged to connect the column drive circuit 50 to column 46 and the row drive circuit 56 to row 48. Coincident pulses $i_y$ and $i_1$ are applied by drive circuits 50 and 56 in the directions shown in FIG. 11*a*. Their amplitudes are sufficient so that the vector sum of the column drive current $i_y$, the bridge current $i_b$ induced by the row drive current $i_1$, and the persistent circulating current $i_p$ drives the bridge normal. When the drive pulses end, the persistent circulating current has changed direction and now flows counterclockwise in the lower loop as shown in FIG. 11*b* and clockwise in the upper loop, thereby representing storage of the binary digit "one." The vector sum of $i_y$ and $i_p$ and the vector sum of $i_1$ and $i_p$ is less than the critical current $i_c'$ so that none of the elements receiving only one of the drive currents $i_y$ or $i_1$ is driven normal.

During the read operation, coincident current pulses $i_y$ and $i_1$ are applied in a direction to switch a selected memory element such as 40, 40*a* to the "zero" state as is shown in FIG. 12*a*. If the memory element is initially storing the binary digit "zero," as is also shown in FIG. 12*a*, the bridge current $i_b$ induced by the row drive pulse is in a direction opposite to the persistent circulating current at the bridge and the vector sum $i_R$ of the three currents $i_p$, $i_b$ and $i_y$ is insufficient to switch the bridge from its superconducting to its normal state. Therefore, current continues to circulate clockwise in the lower loop, as shown in FIG. 12*b*, and counterclockwise in the upper loop. If the memory element is storing the binary digit "one," then the bridge current $i_b$ induced by the row drive current $i_1$ is in the same direction as the persistent circulating current $i_p$ and the vector sum of the currents $i_p$, $i_b$ and $i_y$ is sufficient to change the bridge from its superconducting to its normal state.

When the bridge, such as 44 of memory element 40, 40*a*, is switched from its superconducting to its normal state, the resistance of column 46 changes from "zero" (all bridges in the column are superconducting) to some finite value of resistance. As already mention, the pulse applied by column drive circuit 50 is a constant current pulse (the internal resistance of the column drive circuit is substantially greater than that of the resistance of the bridge). Accordingly, the voltage across the column 46 abruptly increases and a voltage pulse is applied to the read amplifier 58. The latter is normally disabled but is gated on during the read interval as, for example, by applying an enabling pulse to the amplifier 58 during this interval. This is shown schematically in FIG. 13 by the legend "Strobe Input" applied to terminal 59. Thus, when a bridge goes normal during the read interval, the voltage pulse appearing across the column containing that bridge is amplified by the read amplifier 58, and an output signal appears at terminals 62.

After the coincident read pulses are over, an interrogated memory element which formerly stored the binary digit "one," now stores the binary "zero." Thus, the coincident read pulses automatically clear the memory element. On the other hand, an interrogated memory element which formerly stored the binary digit "zero" produces no output pulse during the read period and remains in the "zero" state. Thus, the readout of the memory is destructive. However, the read information can be restored into the memory element by following the read portion of the memory cycle with a write portion as in conventional memories. During the write portion of the cycle the polarity of the row current $i_1$ is reversed to rewrite the binary "one" digit into the memory element. If the selected memory element formerly stored a binary "zero," no currents need be applied during the write cycle. Information may be read from and written into any other one of the memory elements in similar fashion.

A preferred method for making the memory circuits according to the present invention is as follows. The films 10 and 12 (FIG. 1) are very thin. They may be supported on an insulating substrate such as a glass plate. Preferably, the plate is first cleaned by washing in a suitable cleaning solution. A mask is placed over the clean glass plate and the masked plate then placed in a vacuum. Some lead is also placed in the vacuum and heated to its boiling point. The evaporated lead then plates on to the glass through the mask. Evaporation may be continued for one to two minutes or so. The mask is then removed and a second mask placed over the plate for printing on the layer which insulates the bridge from the winding. Silicon monoxide is then vacuum evaporated to form the insulating layer. The time for evaporation is somewhat longer—5 to 10 minutes. The final winding 12 may be plated on in the same way. A softer material such as tin may be employed.

The dimensions for the memory circuit may be as follows. The letters are shown in FIG. 1.

$a$=2 mils
$b$=2 mils
$c$=6 mils
$d$=5 mils
$e$=2 mils
Film thickness=2,000 angstroms The memory circuit of the invention is capable of very high speed operation. For example, speeds of a microsecond are easily obtained, and, with appropriate materials and dimensions, speeds of substantially less than a microsecond are feasible.

An important advantage of the memory circuit of this invention is its extreme simplicity and ease of fabrication. Only two crossed films are required for the read, write and sense operations. The films are very easily applied, requiring only three evaporation steps, one for each metal film, and one evaporation step for the insulation. In many previous superconductor film memories, $x$ and $y$ drive windings, a sense winding, and a storage element are required and eight or more evaporation steps are needed.

What is claimed is:

1. A superconductor memory circuit comprising, a pair of crossed superconducting films, one in the form of two loops joined by a superconductor portion which is of restricted cross-section in a direction perpendicular to that along which the loops extend and the other in the form of a lead spaced from and immediately adjacent to said superconductor portion of restricted cross-section.

2. A superconductor memory circuit comprising, in combination, a pair of crossed superconducting films, one in the form of two loops joined by a superconductor bridge which is of restricted cross-section in a direction perpendicular to that along which the loops extend and the other in the form of a lead spaced from and immediately adjacent to the bridge; and means for applying currents to the two films of a magnitude such that the vector sum of the current applied to the bridge and the current induced in the bridge by the current in the lead is sufficient to quench the superconductivity of the bridge.

3. A superconductor memory circuit comprising, in combination, a pair of superconductor elements at substantially right angles to one another, one in the form of at least two loops joined by a superconductor bridge which is of restricted cross-section in a direction perpendicular to that along which the loops extend and the other in the form of a lead spaced from and immediately adjacent to said bridge; and means for applying currents to the two films of a magnitude such that the vector sum of the current applied to the bridge and the current induced in the bridge by the current in the lead is sufficient to quench the superconductivity of the bridge.

4. In the combination as set forth in claim 3, said element which includes loops being formed of a soft superconductor and said element in the form of a lead being formed of a hard superconductor.

5. A superconductor memory circuit comprising, in combination, a plurality of rows of superconductor elements; a plurality of columns of superconductor elements, said columns being physically separated from each other, each column comprising a plurality of pairs of superconductor loops, each pair joined by a superconductor bridge which is of restricted cross-section in a direction perpendicular to that along which the loops extend, each row of superconductor elements being spaced from and adjacent to a different bridge in each column; and means for applying coincident current pulses to selected row and column superconductor elements.

6. In a superconductor memory circuit as set forth in claim 5, said column and row elements being in the form of superconductor films.

7. A superconductor memory circuit comprising, in combination, a plurality of rows of superconductor elements; a plurality of columns of superconductor elements, each column comprising a plurality of pairs of superconductor loops, each pair joined by a superconductor bridge which is of restricted cross-section in a direction perpendicular to that along which the loops extend, each row of superconductor elements being spaced from and adjacent to a different bridge in each column; means for applying coincident current pulses to selected row and column superconductor elements; and a sense circuit which is common to all columns effectively connected across all of said columns for sensing when a bridge is driven from its superconducting to its normal state.

8. A superconductor memory circuit comprising, in combination, a pair of crossed superconducting films, one in the form of two loops joined by a superconductor bridge of restricted cross-section and the other in the form of a lead spaced from and immediately adjacent to the bridge; means for inducing persistent circulating currents in said loops which flow clockwise in one loop and counterclockwise in the other loop; and means for applying currents to the two films of a magnitude such that the vector sum of the current applied to the bridge, the persistent circulating current at the bridge, and the current induced in the bridge by the current in the lead is sufficient to quench the superconductivity of the bridge.

References Cited in the file of this patent

UNITED STATES PATENTS

| | | |
|---|---|---|
| 2,897,482 | Rosenberg | July 28, 1959 |
| 2,930,908 | McKeon | Mar. 29, 1960 |

OTHER REFERENCES

"An Analysis of the Operation of a Persistent-Supercurrent Memory Cell," by R. L. Garwin, IBM Journal, October 1957, pp. 304–308.

"Trapped-Flux Superconducting Memory," by J. W. Crowe, IBM Journal, October 1957, pp. 295–302.

"Cryogenic Devices in Logical Circuitry and Storage," by J. W. Bremer Electrical Manufacturing, February 1958, pp. 78–83.